(12) United States Patent  
Wylie et al.

(10) Patent No.: US 7,896,995 B2  
(45) Date of Patent: Mar. 1, 2011

(54) TEXTILE BACKED PILE ARTICLE AND METHOD FOR MAKING SAME

(75) Inventors: Grant E. Wylie, Honeoye, NY (US); Thongdy Chanthabane, Farmington, NY (US); Robert C. Horton, Canandaigua, NY (US)

(73) Assignee: Ultrafab, Inc., Farmington, NY (US)

( * ) Notice: Subject to any disclaimer, the term of this patent is extended or adjusted under 35 U.S.C. 154(b) by 620 days.

(21) Appl. No.: 12/001,727

(22) Filed: Dec. 11, 2007

(65) Prior Publication Data

US 2008/0093007 A1   Apr. 24, 2008

Related U.S. Application Data

(62) Division of application No. 10/272,065, filed on Oct. 16, 2002, now Pat. No. 7,329,450.

(51) Int. Cl.  
*B29C 65/08* (2006.01)  
*D05C 15/00* (2006.01)  
*E06B 7/16* (2006.01)

(52) U.S. Cl. .................. 156/72; 156/73.1; 156/173; 49/475.1

(58) Field of Classification Search .......... 156/72, 156/73.1, 172, 173; 49/475.1, 484.1, 489.1, 49/490.1; 428/95, 96, 122  
See application file for complete search history.

(56) References Cited

U.S. PATENT DOCUMENTS

| | | | |
|---|---|---|---|
| 2,449,668 A | 9/1948 | Peterson | |
| 2,677,632 A * | 5/1954 | Easton | 428/93 |
| 3,002,253 A | 10/1961 | Kessler | |
| 3,175,256 A | 3/1965 | Horton | |
| 3,352,604 A | 11/1967 | Melcher | |
| 3,638,290 A | 2/1972 | Johnson | |
| 3,689,117 A | 9/1972 | Hules | |
| 3,745,053 A | 7/1973 | Johnson, et al. | |
| 3,836,421 A | 9/1974 | Terry, Jr. et al. | |
| 3,935,043 A | 1/1976 | Kessler | |
| 4,057,668 A * | 11/1977 | Metzler | 428/85 |
| 4,148,953 A | 4/1979 | Horton | |
| 4,242,392 A | 12/1980 | Yackiw | |
| 4,288,482 A | 9/1981 | Beck | |
| 4,288,483 A | 9/1981 | Miska et al. | |
| 4,302,494 A | 11/1981 | Horton | |
| 4,305,984 A | 12/1981 | Boyce | |
| RE31,403 E | 10/1983 | Burrous | |
| 4,499,845 A * | 2/1985 | Pope | 116/137 A |
| 4,549,684 A * | 10/1985 | Telly et al. | 228/110.1 |
| 4,970,829 A | 11/1990 | Brautigam | |

(Continued)

FOREIGN PATENT DOCUMENTS

| | | |
|---|---|---|
| GB | 533 525 | 2/1941 |
| GB | 1 596 570 | 8/1981 |
| WO | WO 96/06965 | 3/1996 |

*Primary Examiner*—Michael A Tolin  
(74) *Attorney, Agent, or Firm*—Kenneth J. Lukacher; Martin Lukacher (57) ABSTRACT

A pile article is provided having a band of textile material, and a plurality of fiber loops defining a pile having sides from ends extending longitudinally along the band. The band is ultrasonically welded to the ends and a portion of the sides of the pile, and is sufficiently wide to support the sides of the pile substantially upright. An interior textile strip may optionally extend longitudinally within the pile at the ends of the pile and within a portion of the pile sides.

6 Claims, 6 Drawing Sheets

U.S. PATENT DOCUMENTS

| | | |
|---|---|---|
| 5,093,181 A | 3/1992 | Sanchez |
| 5,245,386 A | 9/1993 | Asano et al. |
| 5,338,382 A | 8/1994 | Johnson et al. |
| 5,438,802 A | 8/1995 | Johnson |
| 5,472,762 A | 12/1995 | Edwards et al. |
| 5,681,637 A | 10/1997 | Kessler et al. |
| 5,817,390 A | 10/1998 | Johnson |
| 5,913,348 A | 6/1999 | Horton |
| 6,252,757 B1 | 6/2001 | Loughney et al. |
| 6,711,858 B1 | 3/2004 | Albanese et al. |
| 6,974,512 B2 | 12/2005 | Henry et al. |
| D523,274 S | 6/2006 | Miyoshi |
| 7,172,006 B2 | 2/2007 | Day et al. |
| 2002/0168507 A1 | 11/2002 | Hope |
| 2004/0074719 A1 | 4/2004 | Loughney |
| 2007/0014966 A1 | 1/2007 | Day et al. |

* cited by examiner

TEXTILE BACKED PILE ARTICLE AND METHOD FOR MAKING SAME

This application is a division of U.S. patent application Ser. No. 10/272,065, filed Oct. 16, 2002, now U.S. Pat. No. 7,329,450, issued Feb. 12, 2008.

FIELD OF THE INVENTION

The present invention relates to pile articles, and particularly to textile backed pile articles. The invention is useful for providing a flexible pile article capable of being used as a brush for applying paint, or as weatherstripping.

BACKGROUND OF THE INVENTION

Pile articles are conventionally assembled by winding fibers about a moving band or mandrel, such as described in U.S. Pat. Nos. 4,148,953, 4,302,494, 6,252,757, 5,472,762, and International Application Publication No. WO 96/06965, and then attaching the resulting fiber loops to backing structures (e.g., substrates, strips, or strands) at positions along the such fiber loops, such that by slitting or cutting the fiber loops multiple pile articles are provided each one attached to a one of the backing structures. Typically, attachment to backing structures is by ultrasonic welding, pressure bonding, or adhesive, or a combination thereof.

Often backing structures used in pile articles for weatherstripping have been made of rigid strips of plastic material, such as polypropylene, as described in U.S. Pat. Nos. 4,148,953, 4,242,392, and 4,302,498. As a result, such backing structures have limited flexibility, and melting temperatures too low for high temperature environments. Moreover, pile articles with plastic backing structures are not readily useful in applications requiring sewing or stitching of the pile article to fabric materials. Thus, it would be desirable to provide a pile article with a backing structure composed of textile material which will improve flexibility of the pile article and provides a high temperature melting point.

Pile articles have been developed utilizing textile backing structures or strips, as described in U.S. Pat. Nos. 3,002,253, 3,175,256, 3,836,421, and Re. 31,303. However, these backing structures do not attach to the pile in a manner to provide improved flexibility by conforming a textile backing member to a portion of the end and sides of pile to maintain the pile substantially upright.

SUMMARY OF THE INVENTION

Accordingly, it is the principal object of the present invention to provide a pile article with enhanced flexibility using a textile band which overcomes the drawbacks of the prior art pile articles using plastic backing structures.

Another object of the present invention is to provide a pile article having a flexible textile band which is ultrasonically welded to conform to ends of the pile and a portion of the pile sides from such ends to maintain the pile substantially upright.

Briefly described, the pile article embodying the present invention has a band of textile material, and fiber loops of yarn have sides from closed ends defining a pile extending longitudinally along the band. The band is sufficiently wide and ultrasonically welded to the pile to enclose a portion of the pile, including the ends of the loops and part of the sides of the loops, to support such sides substantially upright.

The textile band may be welded to the pile using an ultrasonic head or horn having a cavity shaped to fold and weld the band about the closed ends and along a portion of the pile sides to fully conform the band to the pile at such closed ends and pile sides. Optionally, an interior textile strip may be provided extending longitudinally within the loops of pile inside the ends and within a portion of the pile sides.

In brush applications, the pile sides may be made longer than the extent of the band along such pile sides to provide a brush sufficient for applying paint. In fabric applications, the band provides support for the pile enabling the pile article to be sewed into one or more fabric members. In weatherstrip applications, the pile and band may be of sufficiently rigid material to provide a weatherstrip.

A method for assembling two of the pile articles is also provided along a moving mandrel. One or more fibers are wound around the moving mandrel to form continuous fiber loops having two opposing ends, each adjacent to one of two opposing edges of the mandrel, and sides extending between such opposing ends. Next, a textile band is applied, folded, and ultrasonically welded to fully conform to one of the ends of the fiber loops along the moving mandrel and at least a portion of the sides extending from those ends. Another textile backing band is then applied, folded, and ultrasonically welded to fully conform to the other of the ends of the fiber loops along the moving mandrel and at least a portion of the sides extending from those ends. The fiber loops are slit along the top and bottom surfaces of the moving mandrel to provide two elongated pile article structures each having a textile band which is sufficiently wide when welded to the sides of the fiber loops to maintain such sides substantially upright.

Prior to winding of the fibers, two interior strips may optionally be applied to the mandrel in which each of the interior strips is applied longitudinally along a different one of mandrel's two opposing edges, such that the fibers can be wound over the interior strips.

The term textile herein refers to any fabric or cloth material where fibers are joined, such as woven.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

The construction of the pile article embodying the invention may be understood from FIGS. 1-6. The method of fabricating the pile article is similar to the fabrication method for weatherstripping described in U.S. Pat. Nos. 4,148,953, 4,302,494, and 5,338,382. The apparatus 8 permits two pile articles 10 to be fabricated simultaneously. An endless mandrel (or metal band) 12 is continuously driven in a direction from left to right, as indicated by arrow 11 in FIG. 1. Refer to U.S. Pat. No. 4,302,494, which is herein incorporated by reference, for further information on the use of the mandrel in fabricating a pile article. An optional stripper wire 13 may be laid on each of the opposite surfaces 12a and 12b of the mandrel 12 offset from the center of the mandrel 12, as described in U.S. Pat. No. 4,148,953.

Optionally, a forming head 14 is provided through which the mandrel 12 passes when two optional interior textile strips are provided as part of the pile article. When the forming head is used, the two interior textile strips 16 are fed into the forming head 14 and are wrapped by the forming head around each of the opposing side edges 12c and 12d of the mandrel 12. The interior textile strips 16 may be made of polyester, or other fabric material. The width of each interior strip 16 is sufficient to allow the forming tool 14 to fold the strip 16 around the edge of the mandrel 12 longitudinally as the mandrel moves, so that a portion extends on the top surface 12a and bottom surface 12b of mandrel 12. The extent of each of the strips 16 along the top and bottom surfaces of the mandrel may be equal or unequal. For example, the width of mandrel 12 may be 3.5 cm, the width of each of the interior strips 16 about 0.6 cm, and about ¼ of such width of the strip folded over the top surface, and remaining ¾ of the width over the bottom surface about one of respective edges 12c or 12d.

Next, fibers in the form of yarn 18, such as of monofilament polyester, are wound around the mandrel 12 to form loops defining a pile 19. (The yarn 18 is wound over the two interior strips 16, if present upon the mandrel's edges 12c and 12d). One or more strands of the yarn 18 are wound as they travel through the apparatus 8. Weaving heads 20 spin and wind the yarn 18. One such weaving head 20 is shown. It will be appreciated that separate weaving heads are provided for each strand of yarn. The density of the pile 19 which is provided is a function of the number of strands which are wound. Although polyester fiber is preferred, other fibers, such as of polypropylene, may less preferably be used. The resulting pile 19 has continuous loops of yarn 18 about mandrel 12 having closed loop ends 22a and 22b along edges 12c and 12d, respectively, of mandrel 12, and two pile sides 22c extending between closed loop ends 22a and 22b along the top and bottom surfaces 12a and 12b, respectively, of mandrel 12.

Further along the travel of the mandrel 12, a flexible textile band (or backing) 24, delivered from a reel from which the band is wound, to a wheel 26 adjacent the pile 19 along edge 12d of mandrel 12 (i.e., at closed loop ends 22b). The band 24 is wider than the edge 12d of the mandrel 12 so that it can be folded around at least a portion of each of the two sides 22c of the pile 19 extending from closed loop ends 22b. The wheel 26 has a flat channel 27 along its outer edge which guides the band 24. Wheel 26 turns with movement of mandrel 12 to apply the band 24 to yarn 18 as mandrel edge 12d extends into channel 27 (see FIG. 4). The band 24 is made of textile material, such as polyester, which can be ultrasonically fused or welded to the yarn. If present, interior strips 16 may be made of the same material as band 24.

Figure 3:
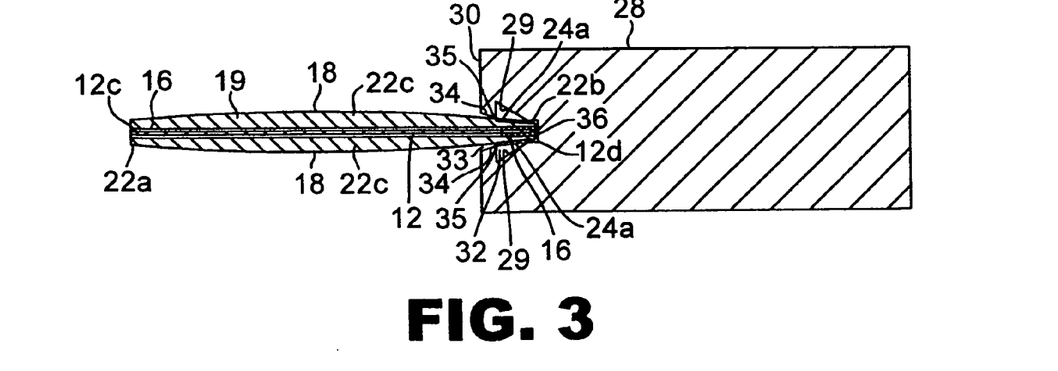
FIG. 3 is a cross-sectional view of the apparatus of FIG. 1 along lines A-A of FIG. 2.
Figure 3A:
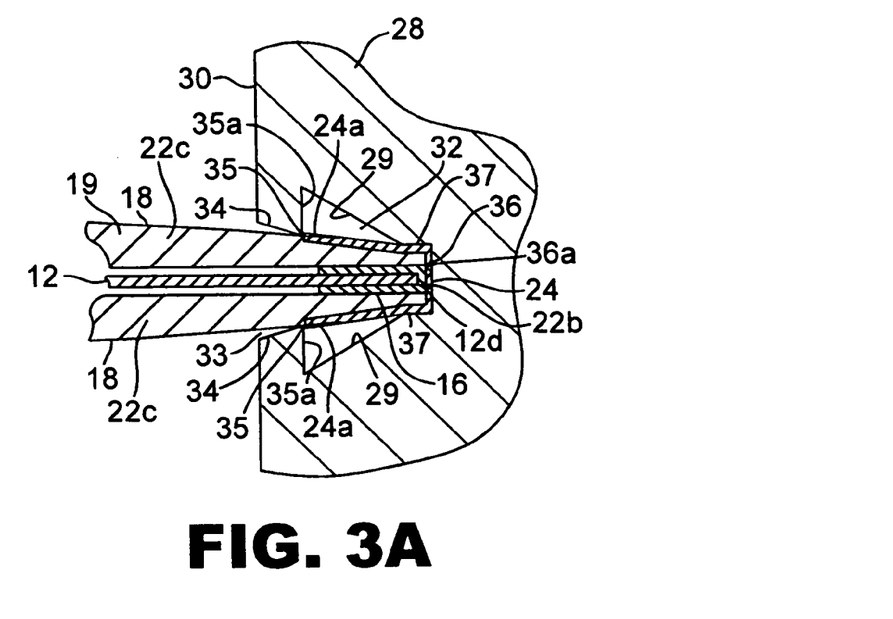
FIG. 3A shows a partial more detailed view of FIG. 3 showing the ultrasonic welding head of FIG. 1.
Figure 3B:
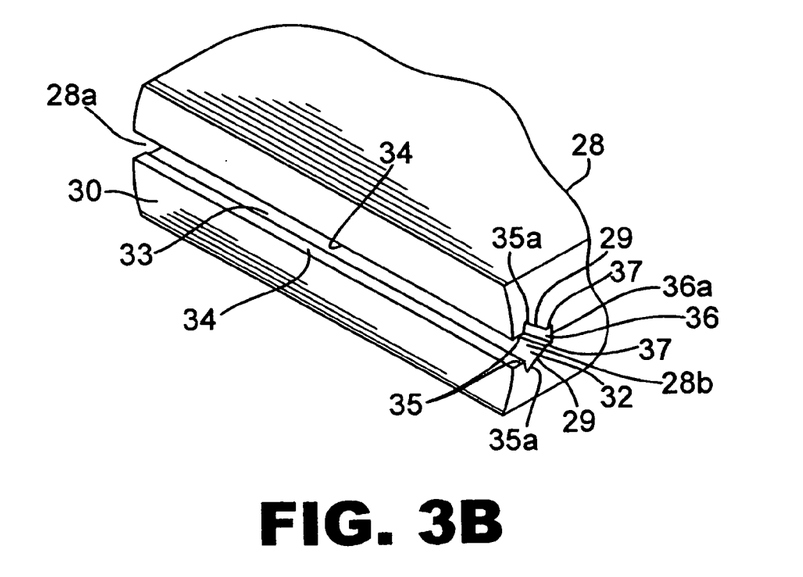
FIG. 3B shows a partial front perspective view of the ultrasonic welding head of FIG. 1 with the mandrel and pile removed.

Next, an ultrasonic head (or horn) 28 is provided having a front 30 and longitudinal cavity 32 with side open ends 28a and 28b, and a front longitudinal opening 33, through which is received part of the sides 22c and closed loop ends 22b of pile 19 and part of mandrel 12 adjacent thereto, to locate the closed loop ends 22b and band 24 adjacent such ends into a longitudinal bottom flat channel 36 of cavity 32 (FIGS. 3, 3A, and 3B). The front opening 33 may have inwardly tapered side surfaces 34 to guide edges 35 along two longitudinal ledges 35a. Channel 36 has a bottom surface 36a and two upwardly extending side walls 37. For purposes of illustration, the cavity 32 of head 28 is shown in FIG. 3B without mandrel 12 and pile 19. Extending from the two channel walls 37 in cavity 32 are two opposing angled side surfaces 29 that taper away from each other until ledges 35a. In cavity 32, the band 24 along bottom channel surface 36a has two sides 24a each extending upwards along one of the side walls 37 to one of guides edges 35, which fold such sides 24a of the band 24 along pile sides 22c around closed loop ends 22b. As shown in FIG. 3, and in more detail in FIG. 3A, the portion of the band 24 in channel 36 (i.e., along channel bottom 36a and side walls 37) are welded to pile 19, thereby conforming the band 24 to the closed loop ends 22b of pile 19 and a portion of the pile sides 22c extending from those ends.

After exiting cavity 32, the portion of the sides 24a which had extended outside channel 36 to guide edges 35 remains adjacent the pile sides 22c by the folding of the band and its welding to pile 19. Moreover, the band 24 is sufficiently wide such that the pile sides 22c will maintain substantially upright when removed from mandrel 12. The band 24 may extend along the two pile sides 22c equally or unequally. For example, band 24 welded to pile 19 may be 0.7 cm wide having sides 24a extending upwards 0.3 cm along one of sides 22c from closed loop ends 22b, and 0.2 cm along the other of the sides 22c, and the remaining 0.2 cm of the band along the edge of pile 19 at closed loop ends 22b. If interior strip 16 is present, the interior strip 16 is also welded to pile 19 at channel 36 to retain the interior strip 16 to the yarn 18 in the closed loop ends 22b.

Figure 1:
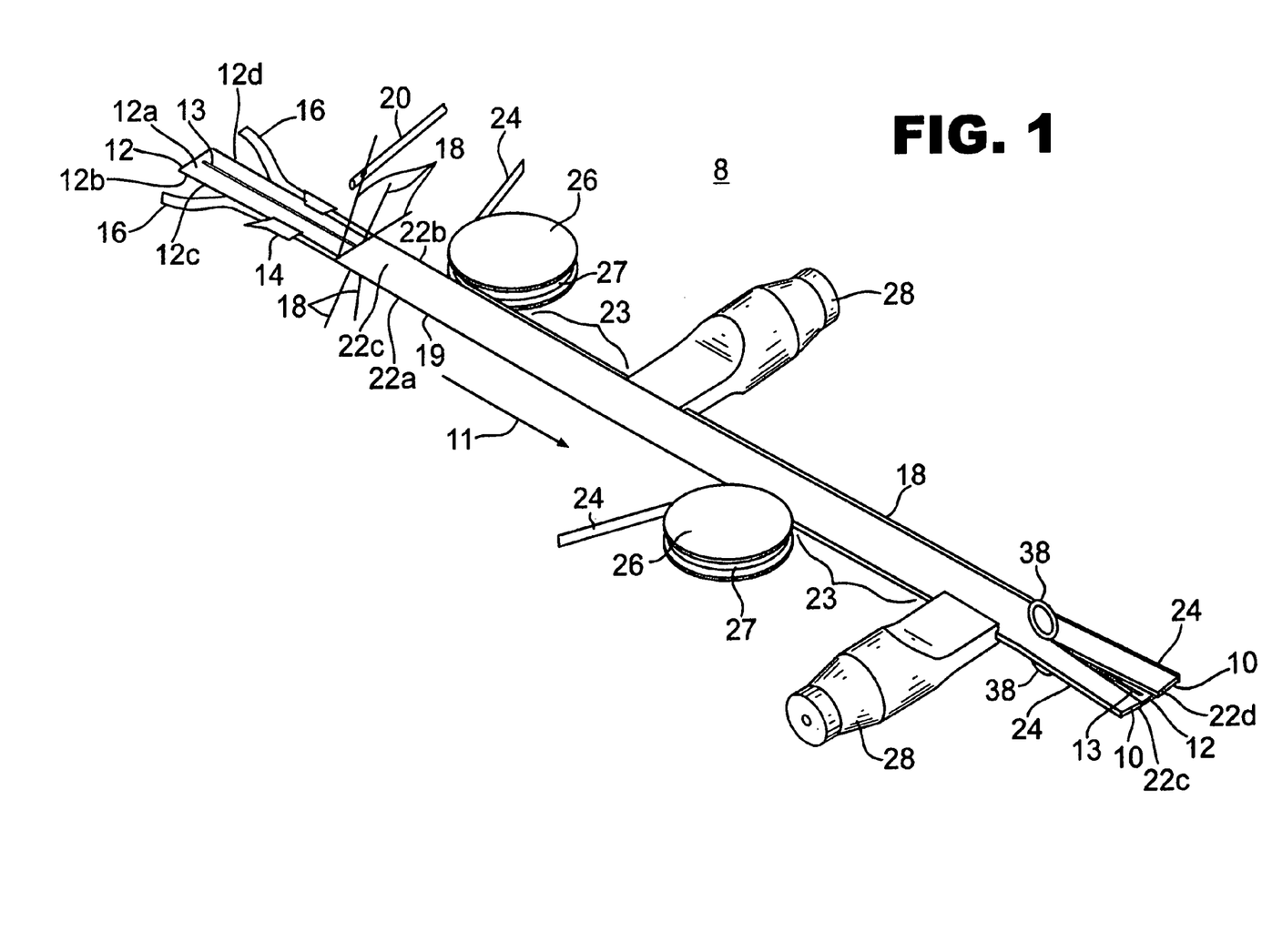
FIG. 1 is a perspective view schematically showing an apparatus for fabricating the pile article which embodies the present invention.
Figure 2:
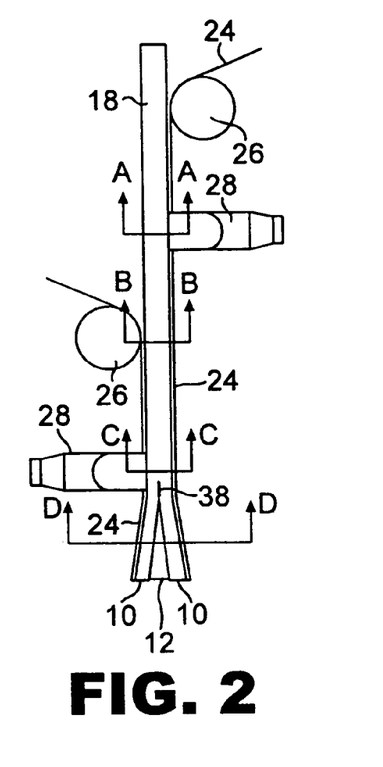
FIG. 2 is a top view of the apparatus of FIG. 1.

The longitudinal interior profile of the ultrasonic head 28 described above in cavity 32 extends through the ultrasonic head 28 from open end 28a to open end 28b. For purposes of illustration, FIG. 3B shows the interior profile of cavity 32 only at side open end 28b. As shown in FIG. 1, the band 24 leaving wheel 27 is substantially flat, but between wheel 27 and ultrasonic head 28 the band 24 forms a "U" shape of increasing curvature about pile 19 along the direction of arrow 11 (as indicated by 23) due to the band being folded about pile 19 by the ultrasonic head 28.

Figure 4:
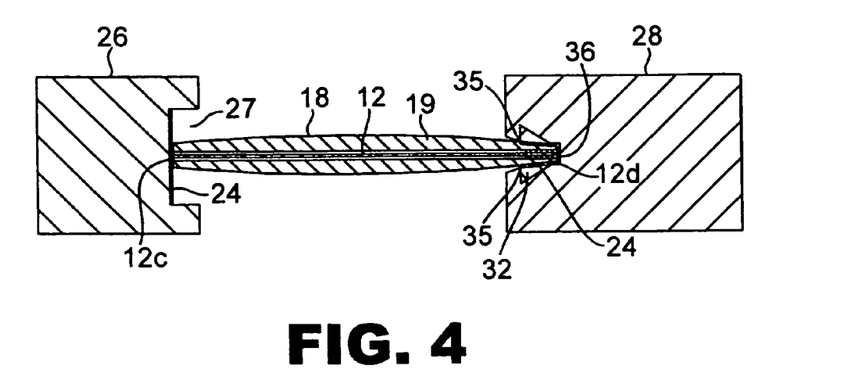
FIG. 4 is a cross-sectional view of the apparatus of FIG. 1 along lines B-B of FIG. 2.
Figure 5:
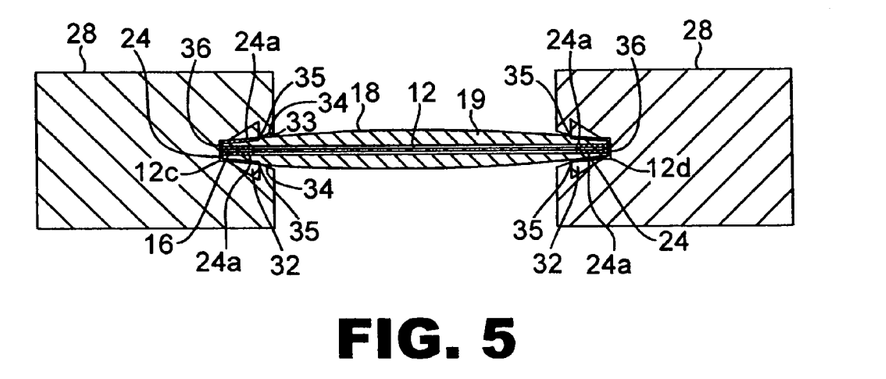
FIG. 5 is a cross-sectional view of the apparatus of FIG. 1 along lines C-C of FIG. 2.

Along the other edge 12c of the mandrel 12, another band 24 is applied by a second one of wheel 26 to the yarn 18 of pile 19, and then a second one of ultrasonic head 28 receives and welds the band 24 (and interior strip 16, if present) to pile 19 at the closed loop ends 22a and a portion of the pile sides 22c extending from such ends in the same manner as described above (FIG. 5). The two ultrasonic welding heads 28 are preferably offset from each other along the path of the mandrel 12. FIG. 4 shows the second wheel 26 and channel 27 for applying band 24 to pile 19 along edge 12c of the mandrel, as similarly performed by the first wheel 26 along edge 12d of the mandrel.

Figure 6:
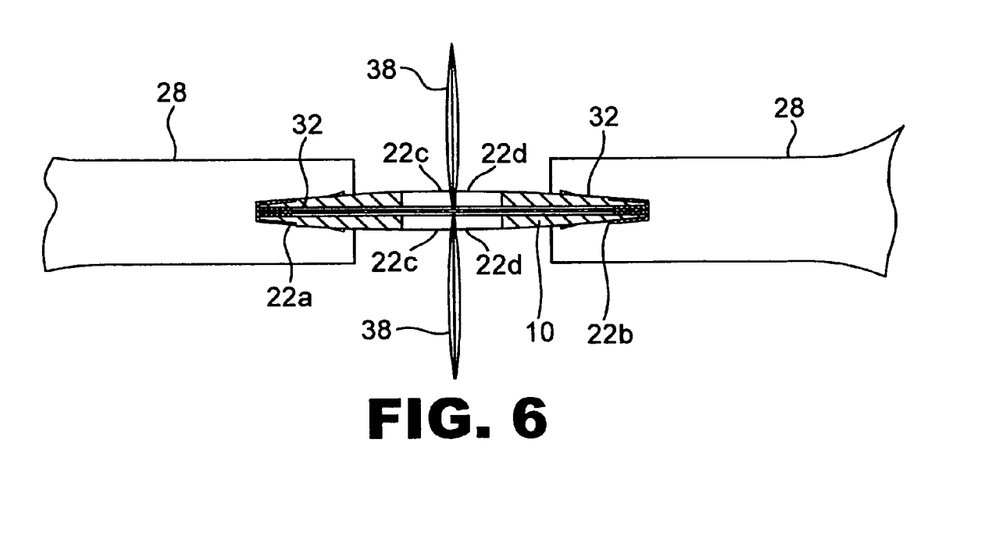
FIG. 6 is a cross-sectional view of the apparatus of FIG. 1 along lines D-D of FIG. 2.

After welding, the mandrel 12 is feed between two slitter wheels 38 which slit through the fiber loops of pile 19 along the top and bottom surfaces 12a and 12b, respectively, thereby providing open ended fiber loops each from closed loop ends 22a and 22b (FIG. 6). Stripper wires 13, if used, lift the yarn away from the mandrel 12 so as to permit slitting without the slitting wheels 38 having to contact the mandrel 12 which might dull the slitter wheels.

Figure 7:
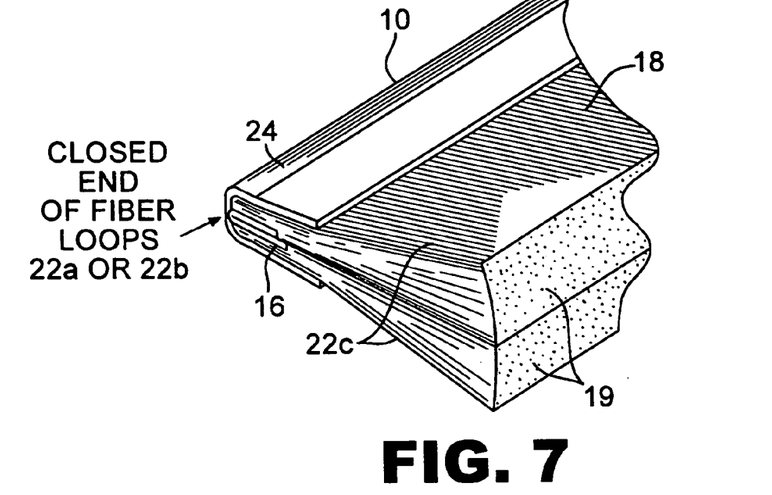
FIG. 7 is a perspective view showing a segment of the completed pile article embodying the invention.

After slitting, two integrated pile article structures are provided each having a band 24 welded to pile 19 about closed loop ends 22a or 22b, respectively, and a portion of the pile sides 22c, and having open loop ends 22c or 22d, respectively. As shown in FIG. 7 with optional interior strip 16, the finished pile article 10 consists of the band 24, two rows of pile 19 made up of yarn fibers 18, and interior strip 16, where the band 24 is welded longitudinally along the pile 19 to fully conform to the pile's closed loop ends and along at least a portion of the pile sides 22c to maintain the pile substantially upright in a direction away from the closed loop ends. Interior strip 16 may conform fully to the interior of the pile 19 within the closed loop ends of pile article 10 and within a portion of pile sides 22c extending from such ends.

Each pile article 10 is provided continuously and is flexible. As the fiber loops are slit, the pile articles may be wound on reels.

Figure 8:
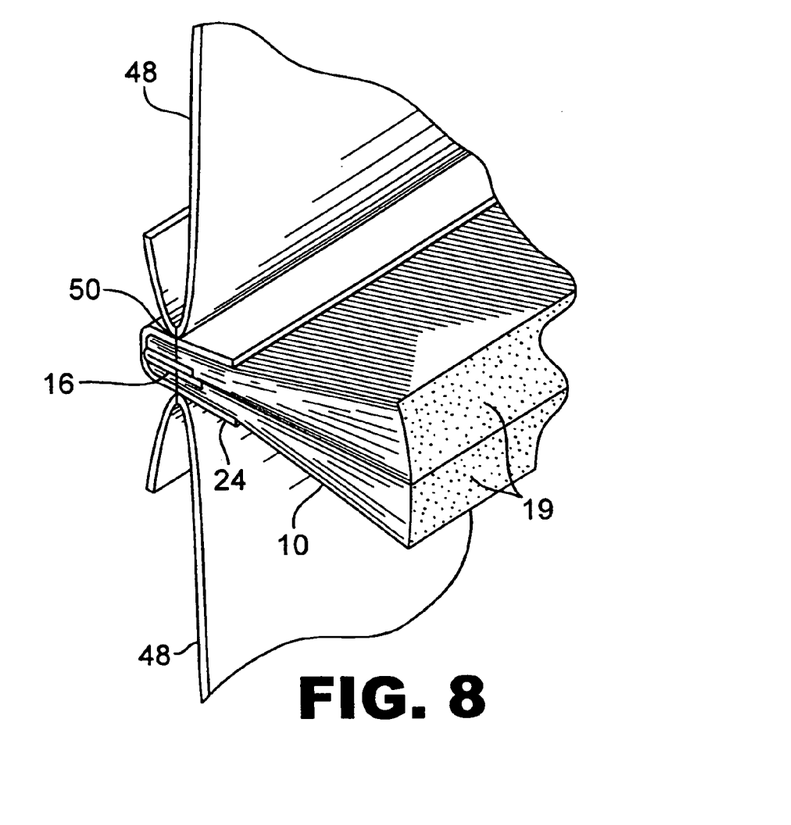
FIG. 8 is a fragmentary perspective view showing the pile article embodying the invention sewn into fabric.

The pile article 10 may be sewn into fabric as shown in FIG. 8. One or more stitches 50 are applied through the band 24 (and possible interior strip 16, if present) along the pile article 10 to coupled the pile article to one or more fabric members 48, which may represent the ends of the same piece of fabric or the ends of two separate pieces of fabric, such as upholstery.

Figure 9:
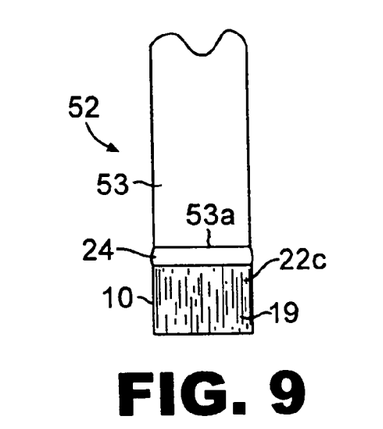
FIG. 9 is a fragmentary view of a segment of the pile article embodying the invention for a brush.

The pile article 10 may be used as a brush 52 as shown in FIG. 9 where the length of the pile sides 22c are longer than the extent of band 24 along such sides 22c. The pile article 10 is cut to a width in the longitudinal direction in accordance with the desired width of the brush 52, and then attached to the end of a paint applying tool (or handle) 53, such as by adhesive. The end 53a of the tool 53 may have a channel (not shown) into which the band 24 of the pile article 10 is received. Thus, brushes of various sizes may be made using pile article 10 and can be applied to appropriately sized tools.

The pile article 10 may be used as a weatherstrip when one or both yarn 18 of pile 19 and band 16 are sufficiently rigid, such that when located in a closure member, e.g., a window or door frame, the yarn 18 compresses and/or fills the space between the frame and another closure member brought adjacent the frame, as typical of weatherstripping. When band 24 and yarn 19 are composed of polyester material, a highly flexible pile weatherstrip is provided suitable for use in higher temperatures than prior art weatherstripping having plastic backing structures, e.g., strip, with lower melting temperature points.

Figure 10:
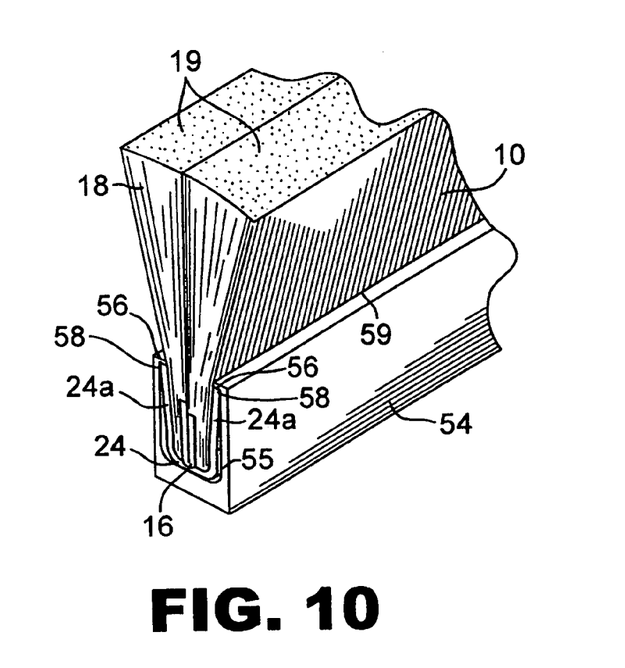
FIG. 10 is a fragmentary sectional view showing the pile article used as a weatherstrip.

An example of pile article 10 used as a weatherstrip is shown in FIG. 10. In the illustrated closure member 54, the pile article 10 is installed in channel 55 which is undercut to capture the band 24 along longitudinal ends (or edges) 58 of band sides 24a, thereby locking the pile article 10 in the channel along channel surfaces 56 and allowing pile 19 to extend through channel opening 59. When inserted through channel opening 59, the band 24 and pile 19 between band sides 24a may need to be compressed, such that when the band 24 is located in channel 55 its expansion captures band sides 24a in the channel along channel surfaces 56.

From the foregoing description, it will be apparent that a pile article with enhanced flexibility has been provided. Variations and modifications of the herein described pile article and method for making such pile article will undoubtedly suggest themselves to those skilled in the art. Accordingly, the foregoing description should be taken as illustrative and not in a limiting sense.

What is claimed is:

1. A method for assembling a pile article comprising the steps of:
   winding one or more fibers around a support to form continuous fiber loops having two opposing ends each adjacent to one of said two opposing edges of the support and sides extending between opposing ends of said support; and
   welding a flexible textile backing member to conform to one of said ends of said fiber loops longitudinally along said support over to enclose at least a portion of said sides of said loops extending upwardly from said one of said ends a distance therefrom, which distance is sufficient to independently support said fiber loops substantially upright from said one of said ends of said loops.

2. A method for assembling a pile article comprising the steps of:
   providing a moving mandrel having top and bottom surfaces, and two opposing edges;
   winding one or more fibers around the mandrel to form continuous fiber loops having two opposing ends each adjacent to one of said two opposing edges of the mandrel and sides extending between said opposing ends; and
   welding a flexible textile backing member to conform to one of said ends of said fiber loops longitudinally along said mandrel over at least a portion of said sides extending upwardly a distance along the sides from said one of said ends of said sides, which distance is sufficient to maintain said fiber loops substantially upright from said one of said ends.

3. The method according to claim 2 wherein said welding step is carried out ultrasonically.

4. A method for assembling a pile article comprising the steps of:
   providing a moving mandrel having top and bottom surfaces, and two opposing edges;
   applying first and second textile interior members to said mandrel in which each of said first and second textile interior members is applied longitudinally along a different one of the two opposing edges of the mandrel;
   winding one or more fibers around the mandrel over the first and second textile interior members to form continuous fiber loops having two opposing ends each adjacent to one of said two opposing edges of the mandrel and sides extending between said opposing ends; and
   applying, folding, and welding a flexible textile backing member to conform to one of said ends of said fiber loops longitudinally along said mandrel and over at least a portion of said sides extending upwardly along the sides of said loop from said one of said ends of said loop a distance, which distance is sufficient to maintain said fiber loops substantially upright from said one of said ends.

5. The method according to claim 4 wherein said textile backing member represents a first textile backing member, and said one of said ends of said fiber loop represents a first one said ends of said fiber loops, said method further comprising the steps of:
   applying, folding, and welding a second flexible textile backing member to conform to a second one of said ends of said fiber loops longitudinally along said mandrel and over at least a portion of said sides also extending upwardly from said second one of said ends a distance sufficient to maintain said fiber loops substantially upright from said second one of said ends; and slitting the fiber loops along the top and bottom surfaces of the mandrel to provide two structures in which a first of said structures has said first textile backing member, said first textile interior member, and said first one of said ends of said fiber loops, and a second of said integrated structures has said second textile backing member, said second textile interior member, and said second one of said ends of said fiber loops.

6. The method according to claim 4 wherein said step of applying first and second textile interior members further comprises the step of folding the first and second textile interior members over their respective different one of the two opposing edges of the mandrel so that said first and second textile interior members conform to the fiber loops within said respective ones of said ends along a portion within said sides from said respective ones of said ends.

\* \* \* \* \*